US012675125B2

(12) United States Patent
Miyashita

(10) Patent No.: US 12,675,125 B2
(45) Date of Patent: Jul. 7, 2026

(54) LINEAR POWER CIRCUIT

(71) Applicant: ROHM CO., LTD., Kyoto (JP)

(72) Inventor: Takashige Miyashita, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 181 days.

(21) Appl. No.: 18/610,515

(22) Filed: Mar. 20, 2024

(65) Prior Publication Data

US 2024/0319752 A1 Sep. 26, 2024

(30) Foreign Application Priority Data

Mar. 24, 2023 (JP) ................................ 2023-048152

(51) Int. Cl.
*G05F 1/56* (2006.01)

(52) U.S. Cl.
CPC .................................. *G05F 1/561* (2013.01)

(58) Field of Classification Search
CPC ..... G05F 3/02; G05F 3/30; G05F 3/22; G05F 3/222; G05F 3/242; G05F 3/225; G05F 3/245; G05F 3/20; G05F 3/00; G05F 3/08; G05F 3/10; G05F 3/16; G05F 3/18; G05F 3/185; G05F 3/227; G05F 3/247; G05F 3/26; G05F 3/265; G05F 3/24; G05F 3/262; G05F 1/10; G05F 1/267; G05F 1/46; G05F 1/561; G05F 1/567; G05F 1/569; G05F 1/571; G05F 1/573; G05F 1/5735; G05F 1/461; G05F 1/462; G05F 1/463; G05F 1/465; G05F 1/466; G05F 1/467; G05F 1/56; G05F 1/562
See application file for complete search history.

(56) References Cited

U.S. PATENT DOCUMENTS 5,821,953 A * 10/1998 Nakano ................ B41J 2/04588 347/10
7,573,246 B2 * 8/2009 Lin ......................... G05F 1/575 323/273
10,768,650 B1 * 9/2020 Huang .................... G05F 1/575
2019/0146532 A1 * 5/2019 Ballarin .................. G05F 1/462 323/283
2022/0197322 A1 * 6/2022 She .................... G11C 16/0483

FOREIGN PATENT DOCUMENTS

JP 7015940 B2 2/2022

* cited by examiner

*Primary Examiner* — Bryan R Perez
(74) *Attorney, Agent, or Firm* — CANTOR COLBURN LLP

(57) ABSTRACT

The present disclosure provides a linear power circuit. The linear power circuit includes an input unit, a current-voltage converter, a voltage-current converter and an output unit. The input unit is configured to receive an input signal and output a first current signal. The current-voltage converter is configured to convert the first current signal into a first voltage signal. The voltage-current converter is configured to convert the first voltage signal into a second current signal. The output unit is configured to generate an output current signal from the second current signal using a current mirror circuit and output the output current signal to an output terminal. The input unit and the current-voltage converter constitute a current feedback operational amplifier.

16 Claims, 4 Drawing Sheets

LINEAR POWER CIRCUIT

CROSS REFERENCE TO RELATED APPLICATIONS

The present invention claims priority under 35 U.S.C. § 119 to Japanese Application, 2023-048152, filed on Mar. 24, 2023, the entire contents of which being incorporated herein by reference.

TECHNICAL FIELD

The present disclosure relates to a linear power circuit.

BACKGROUND

Linear power circuits are used for power circuits of various elements.

Patent document 1 provides an example of such linear power circuits.

PRIOR ART DOCUMENT

Patent Publication

[Patent document 1] Japan Patent Publication No. 7015940

DETAILED DESCRIPTION OF THE EMBODIMENTS

Details of the embodiments are provided with the accompanying drawings below. Generic or specific examples expressed by way of embodiments are described below. Values, shapes, materials, constituting elements, and configuration positions and connections of the constituting elements described in the embodiments below are merely examples, and are not intended as limitations to the present disclosure. Moreover, regarding the constituent elements in the following embodiments, constituent elements that are not described in an independent technical solution representing the most superordinate concept are described as arbitrary constituent elements. Further, for illustrations purposes, scales of sizes of the accompanying drawings may be exaggerated to reveal the presence of situations different from actual scales.

Figure 1:
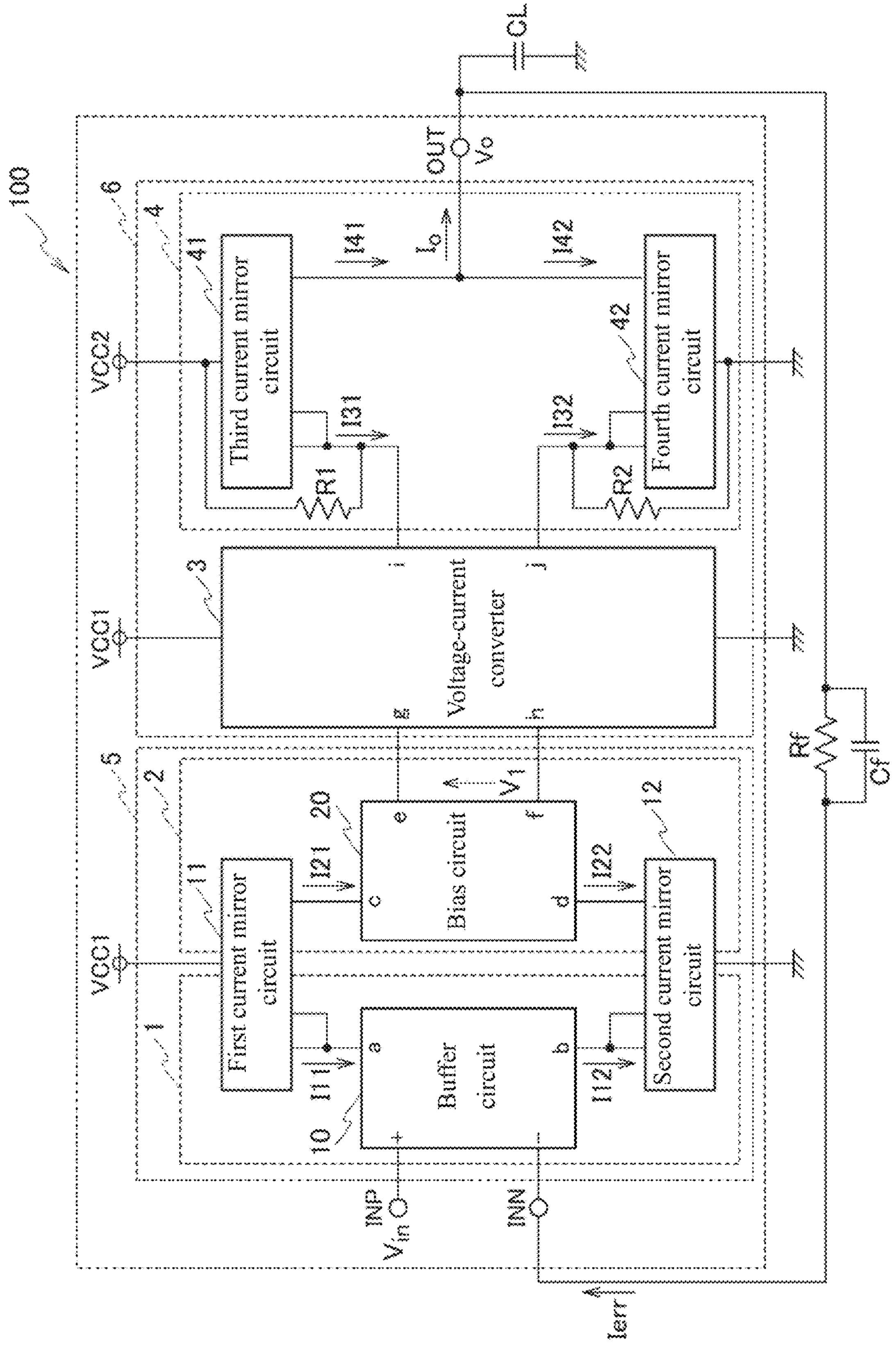
FIG. 1 is a block diagram of a linear power circuit according to an embodiment.

FIG. 1 shows a block diagram of a linear power circuit 100 according to an embodiment. The linear power circuit 100 includes a positive input terminal INP serving as a first input terminal, a negative input terminal INN serving as a second input terminal, an input unit 1, a current-voltage (I/V) converter 2, a voltage-current (V/I) converter 3, an output unit 4 and an output terminal OUT.

For example, an input voltage Vin is input to the positive input terminal INP. For example, a feedback current Ierr from the output terminal OUT is input to the negative input terminal INN. The input unit 1 is input with input signals and generates and outputs first current signals I11 and I12 corresponding to the input signals, wherein the input signals are the input voltage Vin input to the positive input terminal INP and the feedback current Ierr input to the negative input terminal INN. The current-voltage converter 2 converts currents I21 and I22 generated by a first current mirror circuit 11 and a second current mirror circuit 12 as mirror currents of the first current signals I11 and I12 into a first voltage signal V1, and outputs the first voltage signal V1. A value of the first voltage signal V1 changes according to a balance between the current I21 and the current I22. The voltage-current converter 3 converts the first voltage signal V1 into second current signals I31 and I32, and outputs the second current signals I31 and I32. The output unit 4 generates an output current Io as an output current signal Io from the second current signals I31 and I32 using a third current mirror circuit 41 and a fourth current mirror circuit 42, and outputs the output current signal Io to the output terminal OUT.

The input unit 1 includes a buffer circuit 10. The buffer circuit 10 includes, for example, a single ended push-pull (SEPP) circuit. In the buffer circuit 10, an input impedance of a positive input terminal + is higher, and an input impedance of a negative input terminal − is lower in comparison. That is to say, as a characteristic of a current feedback operational amplifier, the negative input terminal − is equivalent to an output terminal of the buffer circuit 10, and so the input impedance of the negative input terminal − is lower. The positive input terminal INP is connected to the positive input terminal + of the buffer circuit 10, and the negative input terminal INN is connected to the negative input terminal − of the buffer circuit 10.

The current-voltage (I/V) converter 2 includes a bias circuit 20. The bias circuit 20 is connected to the buffer circuit 10 via the first current mirror circuit 11 and the second current mirror circuit 12.

Figure 2A:
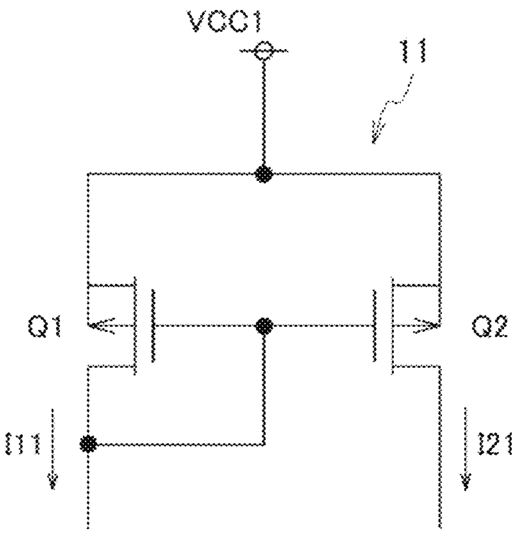
FIG. 2A is a diagram of a configuration example of a first current mirror circuit used in an embodiment.

For example, as shown in FIG. 2A, the first current mirror circuit 11 includes a first transistor Q1 and a second transistor Q2. Each of the first transistor Q1 and the second transistor Q2 is formed by a P-channel metal-oxide-semiconductor field-effect transistor (PMOSFET). A control electrode (for example, a gate) of the first transistor Q1 is connected to a first main electrode (for example, a drain) of the first transistor Q1 and a control electrode (for example, a gate) of the second transistor Q2. Respective second main electrodes (for example, sources) of the first transistor Q1 and the second transistor Q2 are connected to each other and become a power supply terminal connected to a first DC power supply VCC1. The first main electrode (for example, a drain) of the first transistor Q1 is a reference current terminal, through which a reference current (the first current signal I11) flows. The first main electrode (for example, a drain) of the second transistor Q2 is a mirror current terminal, through which a mirror current (the current I21) flows. By changing a size of the second transistor Q2 with respect to that of the first transistor Q1, a ratio (a mirror ratio) of the reference current (the first current signal I11) to the mirror current (the current I21) can be adjusted. For example, if the first transistor Q1 and the second transistor Q2 are of the same size, the mirror ratio is 1, that is, the first current signal I11=I21.

Figure 2B:
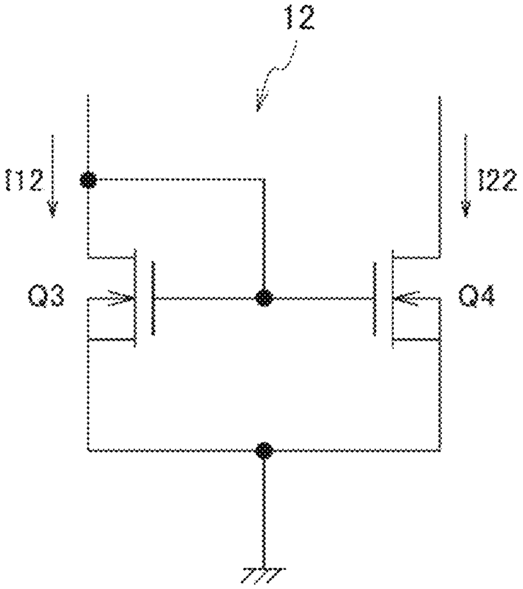
FIG. 2B is a diagram of a configuration example of a second current mirror circuit used in an embodiment.

For example, as shown in FIG. 2B, the second current mirror circuit 12 includes a third transistor Q3 and a fourth transistor Q4. Each of the third transistor Q3 and the fourth transistor Q4 is formed by an N-channel MOSFET. A control electrode (for example, a gate) of the third transistor Q3 is connected to a first main electrode (for example, a drain) of the third transistor Q3 and a control electrode (for example, a gate) of the fourth transistor Q4. Respective second main electrodes (for example, sources) of the third transistor Q3 and the second transistor Q4 are connected to each other and become a power supply terminal connected to a ground. The first main electrode (for example, a drain) of the third transistor Q3 is a reference current terminal, through which a reference current (the first current signal I12) flows. The first main electrode (for example, a drain) of the fourth transistor Q4 is a mirror current terminal, through which a mirror current (the current I22) flows. By changing a size of the fourth transistor Q4 with respect to that of the third transistor Q3, a ratio (a mirror ratio) of the reference current (the first current signal I12) to the mirror current (the current I22) can be adjusted. For example, if the third transistor Q3 and the fourth transistor Q4 are of the same size, the mirror ratio is 1, that is, the first current signal I12=I22. Moreover, if the mirror ratio of the first transistor Q1 to the third transistor Q3 is 1, when a current flowing into the negative input terminal INN does not contain any error current, the feedback current Ierr becomes zero and the first current signal I11=I12. When a current flowing into the negative input terminal INN contains an error current, the feedback current Ierr is non-zero and the first current signal I11+Ierr=I12.

In addition, the configurations of the first current mirror circuit 11 and the second current mirror circuit 12 are not limited to the configurations described above. A current mirror circuit is a commonly known technique in the prior art, and thus an appropriate configuration can be appropriately selected by a designer.

In the first current mirror circuit 11, the power supply terminal is supplied with a DC voltage of the first DC power supply VCC1, the reference current terminal is connected to a first terminal a of the buffer circuit 10, and the mirror current terminal is connected to a first terminal c of the bias circuit 20. In the second current mirror circuit 12, the power supply terminal is grounded, the reference current terminal is connected to a second terminal b of the buffer circuit 10, and the mirror current terminal is connected to a second terminal d of the bias circuit 20. The first transistor Q1 of the first current mirror circuit 11 and the third transistor Q3 of the second current mirror circuit 12 are included in the input unit 1. The second transistor Q2 of the first current mirror circuit 11 and the fourth transistor Q4 of the second current mirror circuit 12 are included in the current-voltage converter 2.

The input unit 1 and the current-voltage converter 2 constitute a current feedback operational amplifier 5.

The buffer circuit 10, according to the input signals input to the positive input terminal + and the negative input terminal −, for example, the input voltage Vin and the feedback current Ierr, generates the first current signal I11 at the first terminal a and generates the first current signal I12 at the second terminal b. The first current mirror circuit 11 generates the current I21 having a predetermined mirror ratio with respect to the first current signal I11, and the current I21 is input to the first terminal c of the bias circuit 20. The second current mirror circuit 12 generates the current I22 having a predetermined mirror ratio with respect to the first current signal I12, and the current I22 is output from the second terminal d of the bias circuit 20. The bias circuit 20 outputs the first voltage signal V1 corresponding to the currents I21 and I22 to between a third terminal e and a fourth terminal f. The first voltage signal V1 is input to a first terminal g and a second terminal h of the voltage-current converter 3.

The voltage-current converter 3 converts the input first voltage signal V1 into the second current signals I31 and I32, and outputs the second current signals I31 and I32 to the output unit 4. In the voltage-current converter 3, the power supply terminal is supplied with the DC voltage having the first DC power supply VCC1.

The output unit 4 includes a third current mirror circuit 41 and a fourth current mirror circuit 42. The third current mirror circuit 41 and the fourth current mirror circuit 42 are formed in a manner similar to the first current mirror circuit 11 and the second current mirror circuit 12 in FIGS. 2A and 2B, and so related details thereof are omitted herein.

In the third current mirror circuit 41, a power supply terminal is supplied with a DC voltage of a second DC power supply VCC2 having a value different from that of the first DC power supply VCC1, and a reference current terminal is connected to a third terminal i of the voltage-current converter 3. In the fourth current mirror circuit 42, a power supply terminal is grounded, and a reference current terminal is connected to a fourth terminal j of the voltage-current converter 3. A mirror current terminal of the third current mirror circuit 41 is connected to a mirror current terminal of the fourth current mirror circuit 42 via the output terminal OUT.

The third current mirror circuit 41 generates a current I41 of a predetermined mirror ratio as a mirror current of the second current signal I31 flowing through the third terminal i of the voltage-current converter 3. The fourth current mirror circuit 42 generates a current I42 of a predetermined mirror ratio as a mirror current of the second current signal I32 flowing through the fourth terminal j of the voltage-current converter 3. A difference between the current I41 and the current I42 is output as the output current Io to the output terminal OUT. When the output current Io is larger, the current I41 and the output current Io are substantially equal, and the current I42 is substantially zero.

A first resistor R1 can also be provided. The first resistor R1 is connected in parallel with the reference current of the third current mirror circuit 41, that is, between the first main electrode and the second main electrode of the first transistor Q1 through which the second current signal I31 flows. Moreover, a second resistor R2 can also be provided. The second resistor R2 is connected in parallel with the reference current of the fourth current mirror circuit 42, that is, between the first main electrode and the second main electrode of the third transistor Q3 through which the second current signal I32 flows. By providing the output unit 4 with the first resistor R1 and the second resistor R2, a no-load current of the output unit 4 can be absorbed and hence reduced by the first resistor R1 and the second resistor R2.

The voltage-current converter 3 converts the input first voltage signal V1 into second current signals I31 and I32 input to the output unit 4 formed by the third current mirror circuit 41 and the fourth current mirror circuit 42, and outputs the second current signals I31 and I32. By constituting the output unit 4 by the third current mirror circuit 41 and the fourth current mirror circuit 42, an output impedance of the output unit 4 can be increased. In addition, the method of increasing the output impedance of the output unit 4 is not limited to using the output unit 4 formed by the third current mirror circuit 41 and the fourth current mirror circuit 42. Moreover, by constituting the output unit 4 by the third current mirror circuit 41 and the fourth current mirror circuit 42, as shown in FIG. 1, the first DC power supply VCC1 of the input unit 1 and the second DC power supply VCC2 of the output unit 4 can be differentiated. Thus, in the linear power circuit 100, a wide power supply voltage range can be handled. In addition, the power supply of the output unit 4 can also be implemented by the first DC power supply same as the input unit 1.

The voltage-current converter 3 and the output unit 4 constitute a class AB amplifier 6. The bias circuit 20 supplies the first voltage signal V1 to the voltage-current converter 3. The first voltage signal V1 is obtained by adding a voltage obtained from current-voltage conversion of the mirror currents I21 and I22 of the first current signals I11 and I12 corresponding to the input signals Vin and Ierr and a bias voltage of the class AB amplifier 6. By constituting the class AB amplifier 6 by the voltage-current converter 3 and the output unit 4, the linear power circuit 100 is provided with a sink ability to suppress an overshoot of the output voltage Vo when an output load changes. Moreover, according to an application procedure, the linear power circuit 100 can exclude the sink ability.

The current feedback operational amplifier 5 is configured to increase transformer impedance by the bias circuit 20. The so-called transformer impedance of the current feedback operational amplifier is equivalent to an open-loop gain in a voltage feedback operational amplifier, and an error in the gain can be reduced by increasing the transformer impedance. In addition, the method for increasing the transformer impedance of the current feedback operational amplifier 5 is not limited to using the bias circuit 20.

Moreover, the voltage feedback operational amplifier usually includes therein a capacitor for phase compensation. In comparison, the current feedback operational amplifier 5 according to an embodiment does not include therein a capacitor for phase compensation. In substitution, the phase compensation of the linear power circuit 100 can be performed by an external output capacitor CL connected between the output terminal OUT and the ground. By increasing the output impedance of the output unit 4, a first pole of the linear power circuit 100 can be implemented by using the external output capacitor CL for the phase compensation, achieving stable operations of the linear power circuit 100. By adjusting capacitance of the external output capacitor CL, the position of the first pole can be easily adjusted. Moreover, a frequency based on the first pole of the output capacitor CL can be reduced by increasing the output impedance of the output unit 4, hence achieving stable operations of the linear power circuit 100.

When the linear power circuit 100 is configured as a buffer amplifier, since the linear power circuit 100 is configured to use a current feedback operational amplifier, a feedback resistor Rf for flowing the feedback current Ierr is inserted on a path connecting the output terminal OUT and the negative input terminal INN. Moreover, a feedback capacitor Cf can also be connected in parallel with the feedback resistor Rf. When phase advance compensation of the linear power circuit 100 is needed, the position of a second pole can be easily adjusted by adjusting capacitance of the external feedback capacitor Cf.

Figure 3:
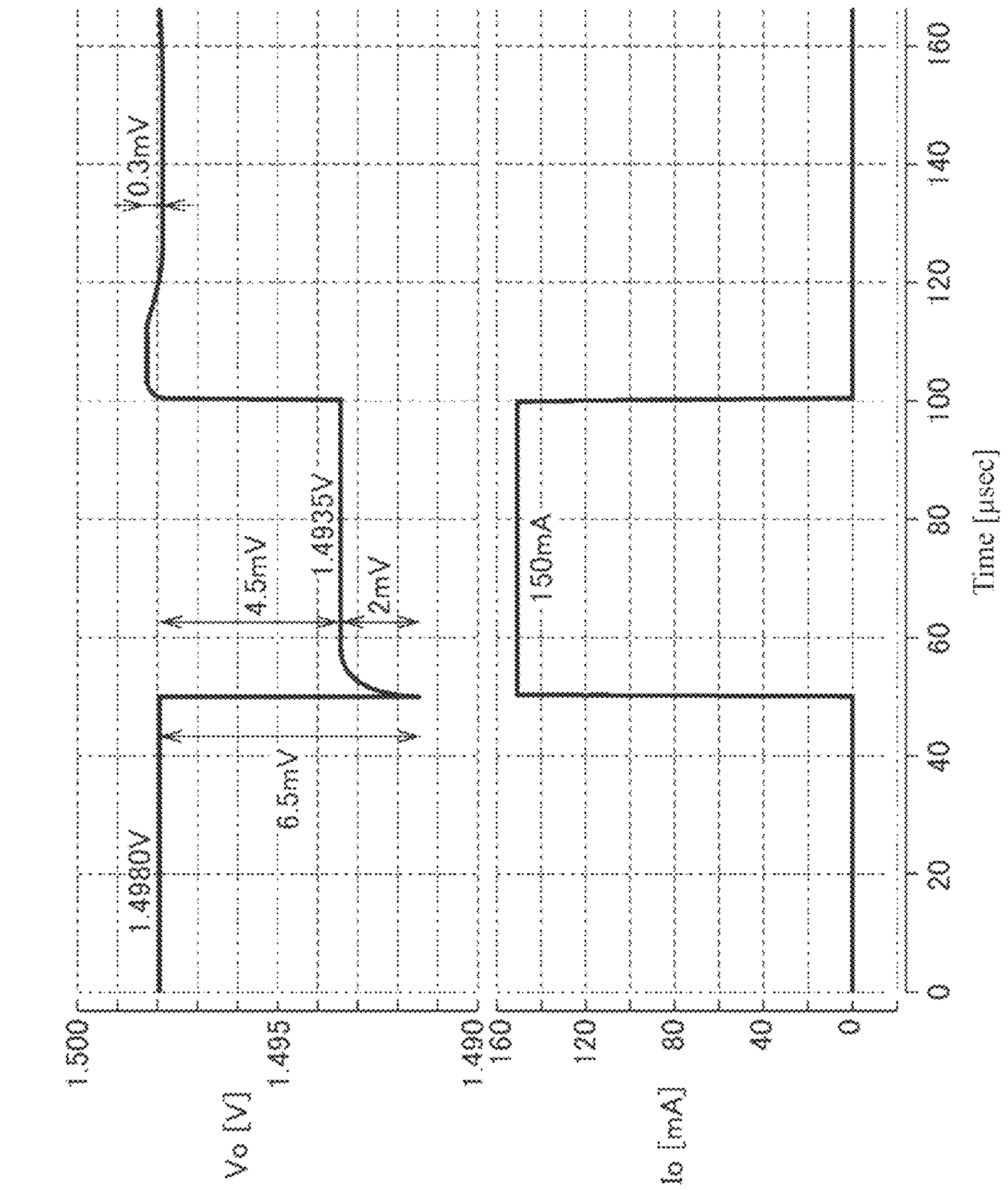
FIG. 3 is a diagram of load response characteristics of a linear power circuit configured as a buffer amplifier according to an embodiment.

FIG. 3 shows a diagram of load response characteristics when the linear power circuit 100 is configured as a buffer amplifier. In the configuration of the buffer amplifier, as shown in FIG. 1, the external output capacitor CL is connected between the output terminal OUT and the ground, the output terminal OUT is connected to the negative input terminal INN via the feedback resistor Rf, and the feedback capacitor Cf is connected in parallel with the feedback resistor Rf. Moreover, the input voltage Vin is input to the positive input terminal INP. Herein, the output capacitor CL=4.7 μF, the feedback resistor Rf=100 kΩ, the feedback capacitor Cf=20 pF, and the input voltage Vin=1.500 V.

As shown in FIG. 3, within a period of time between timings of 0 μs and 50 μs, a stable state in which the output current Io=0 mA, and the output voltage Vo=1.4980 V is achieved. Then, at the timing 50 μs, the load current changes, the output current Io changes from 0 mA to 150 mA, and so the output voltage Vo drops suddenly. At a maximum undershoot of about 2 mV and after a response time of 5 μs, the output voltage Vo=1.4935 V, which has a slight change from 1.4980 V and is stabilized at this point. In addition, at a timing 100 μs, the load current changes, the output current Io changes from 150 mA to 0 mA, and so the output voltage Vo rises suddenly. At a maximum overshoot of about 0.3 mV and after a response time of 20 μs, the output voltage Vo is again substantially stabilized at 1.4980 V.

Compared to the overshoot, undershoot and response time of the linear power circuit 100, the overshoot, undershoot and response time become at least 10 times in a linear power circuit using a voltage feedback operational amplifier.

Figure 4:
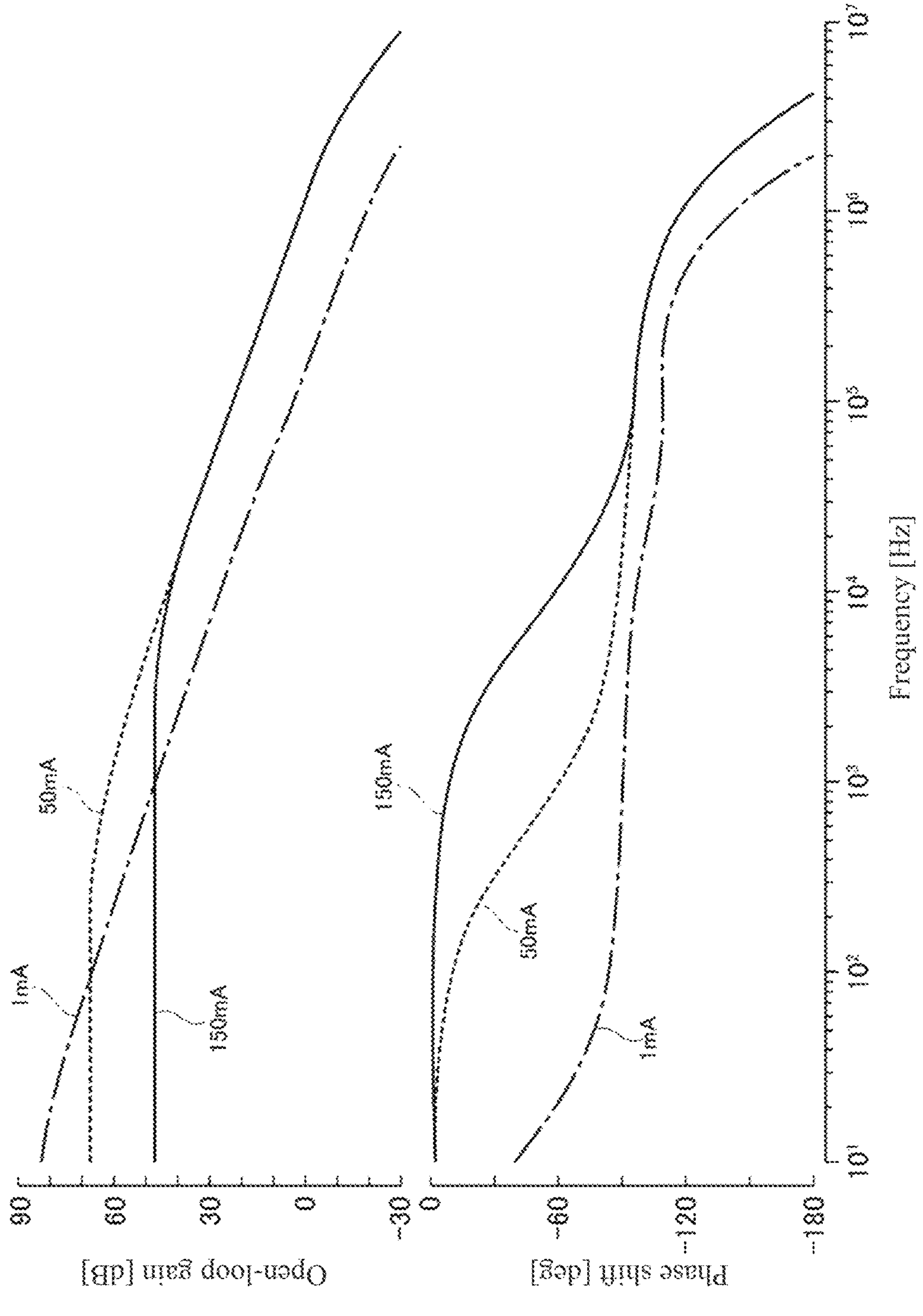
FIG. 4 is a block diagram of open-loop characteristics of a linear power circuit according to an embodiment.

FIG. 4 shows open-loop characteristics of the linear power circuit 100 when the output load is connected to the output capacitor CL of 4.7 μF as a reference. In FIG. 4, the upper part represents the open-loop gain, the lower part represents a phase shift, the horizontal axis represents a frequency, and situations where the output current Io is 150 mA (a solid line), 50 mA (a dotted line) and 1 mA (a dashed dotted line) are respectively shown. As such, the open-loop gain and the phase shift change along with the magnitude of the output current Io. In addition, the position of the first pole of the open-loop gain can be adjusted by adjusting the capacitance of the output capacitor.

In the linear power circuit 100 of the embodiment above, the overshoot, undershoot and response time during a load response can be minimized. That is to say, in the linear power circuit 100, a linear power circuit having fast load response characteristics can be provided, and the linear power circuit can suppress the change in the output voltage when the load current changes sharply to smaller magnitude.

In addition, by minimizing the overshoot and undershoot during a load response, the linear power circuit 100 is capable of reducing the capacitance of the external output capacitor CL, hence achieving a smaller number of parts, lower costs and a smaller area.

In addition, by minimizing the overshoot and undershoot during a load response, the linear power circuit 100 is suitable for internal power supplies of such as low dropout (LDO) regulators and various large-scale integrations (LSI).

Moreover, the embodiments above are examples of the present disclosure. Thus, the present disclosure is not limited to the embodiments, and various modifications in form of other than those of the embodiments may be made according to such as designs without departing from the scope of the technical concept of the present disclosure.

(Notes)

(Note 1: FIG. 1 and FIG. 3)

A linear power circuit (100) includes:

an input unit (1), configured to receive an input signal (Vin, Ierr) and output a first current signal (I11, I12);

a current-voltage converter (2), configured to convert the first current signal (I11, I12) into a first voltage signal (V1);

a voltage-current converter (3), configured to convert the first voltage signal (V1) into a second current signal (I31, I32); and an output unit (4), configured to generate an output current signal (Io) from the second current signal (I31, I32) using a current mirror circuit (41, 42), and output the output current signal (Io) to an output terminal (OUT), wherein the input unit (1) and the current-voltage converter (2) constitute a current feedback operational amplifier (5).

With the linear power circuit (100) according to Note 1, effects of a linear power circuit that provides fast load response characteristics can be achieved. Moreover, by constituting the output unit (4) by the current mirror circuit (41, 42), an output impedance of the output unit (4) can be increased.

(Note 2: FIG. 1)

In the linear power circuit (100) of Note 1, the input unit (1) includes:

a first input terminal (INP), to which the input signal (Vin) is input;

a second input terminal (INN), electrically connected to the output terminal (OUT); and a buffer circuit (10), connected to the first input terminal (INP) and the second input terminal (INN), wherein the input unit (1) is configured to output the first current signal (I11, I12) from the buffer circuit (10) to the current-voltage converter (2).

(Note 3)

In the linear power circuit (100) of Note 2, the buffer circuit (10) comprises a single ended push-pull (SEPP) circuit.

(Note 4: FIG. 1)

The linear power circuit (100) of Note 2 comprises a feedback resistor (Rf) connected between the second input terminal (INN) and the output terminal (OUT). The linear power circuit (100) of Note 4 comprises the feedback resistor (Rf) connected between the second input terminal (INN) and the output terminal (OUT) and can input the feedback current (Ierr) from the output terminal (OUT) to the second input terminal (INN).

(Note 5: FIG. 1)

The linear power circuit (100) of Note 4 includes a feedback capacitor (Cf) connected in parallel with the feedback resistor (Rf). According to the linear power circuit (100) of Note 5, when phase compensation of the linear power circuit (100) is needed, the position of a second pole can be easily adjusted by adjusting capacitance of the external feedback capacitor (Cf).

(Note 6: FIG. 1)

In the linear power circuit (100) of any one of Notes 1 to 5, the voltage-current converter (3) and the output unit (4) constitute a class AB amplifier (6). According to the linear power circuit (100) of Note 6, the voltage-current converter (3) and the output unit (4) constitute a class AB amplifier (6), and so the linear power circuit (100) is provided with a sink ability to suppress an overshoot of the output voltage (Vo) when an output load changes.

(Note 7: FIG. 1)

In the linear power circuit (100) of Note 6, the current-voltage converter (2) includes a bias circuit (20) for the class AB amplifier (6). According to the linear power circuit (100) of Note 7, a gain error can be reduced by increasing transformer impedance by the bias circuit (20).

(Note 8: FIG. 1)

The linear power circuit (100) of any one of Notes 1 to 7 further includes a resistor (R1, R2) connected in parallel with the current mirror circuit (41, 42). According to the linear power circuit (100) of Note 8, the resistor (R1, R2) connected in parallel with the current mirror circuit (41, 42) can absorb and hence reduce a no-load current of the output unit (4).

(Note 9: FIG. 1)

In the linear power circuit (100) of any one of Notes 1 to 8, a power supply voltage (VCC1) supplied to the input unit (1) and a power supply voltage (VCC2) supplied to the output unit (4) are different. According to the linear power circuit (100) of Note 9, since the first DC power supply (VCC1) of the input unit (1) and the second DC power supply (VCC2) of the output unit (4) can be differentiated, a wide power supply voltage range can be handled in the linear power circuit 100.

(Note 10)

In the linear power circuit (100) of any one of Notes 1 to 8, a power supply voltage (VCC1) supplied to the input unit (1) and the output unit (4) is common. According to the linear power circuit (100) of Note 10, since the power supply voltage (VCC1) supplied to the input unit (1) and the output unit (4) is common, the configuration of the linear power circuit (100) can be simplified.

(Note 11: FIG. 1)

In the linear power circuit (100) of any one of Notes 1 to 10, a phase compensation is performed by an external output capacitor (CL) connected between the output terminal (OUT) and a ground. According to the linear power circuit (100) of Note 11, a first pole of the linear power circuit (100) can be implemented by using the external output capacitor (CL) for the phase compensation, achieving stable operations of the linear power circuit (100).

The invention claimed is:

1. A linear power circuit, comprising:

an input unit, configured to receive an input signal and output a first current signal;

a current-voltage converter, configured to convert the first current signal into a first voltage signal;

a voltage-current converter, configured to convert the first voltage signal into a second current signal; and an output unit, configured to:

generate an output current signal from the second current signal using a current mirror circuit, and output the output current signal to an output terminal, wherein the input unit and the current-voltage converter constitute a current feedback operational amplifier, wherein the input unit includes:

a first input terminal, to which the input signal is input;

a second input terminal, electrically connected to the output terminal; and a buffer circuit, connected to the first input terminal and the second input terminal, wherein the input unit is configured to output the first current signal from the buffer circuit to the current-voltage converter, and wherein the linear power circuit further comprises:

a feedback resistor connected between the second input terminal and the output terminal; and a feedback capacitor connected in parallel with the feedback resistor.

2. A linear power circuit, comprising:

an input unit, configured to receive an input signal and output a first current signal;

a current-voltage converter, configured to convert the first current signal into a first voltage signal;

a voltage-current converter, configured to convert the first voltage signal into a second current signal; and an output unit, configured to:

generate an output current signal from the second current signal using a current mirror circuit, and output the output current signal to an output terminal, wherein the input unit and the current-voltage converter constitute a current feedback operational amplifier, and wherein the voltage-current converter and the output unit constitute a class AB amplifier.

3. The linear power circuit of claim 2, wherein the input unit includes:

a first input terminal, to which the input signal is input;

a second input terminal, electrically connected to the output terminal; and a buffer circuit, connected to the first input terminal and the second input terminal, wherein the input unit is configured to output the first current signal from the buffer circuit to the current-voltage converter.

4. The linear power circuit of claim 3, wherein the buffer circuit comprises a single ended push-pull (SEPP) circuit.

5. The linear power circuit of claim 3, comprising a feedback resistor connected between the second input terminal and the output terminal.

6. The linear power circuit of claim 2, wherein the current-voltage converter includes a bias circuit for the class AB amplifier.

7. The linear power circuit of claim 2, further comprising a resistor connected in parallel with the current mirror circuit.

8. The linear power circuit of claim 2, wherein a power supply voltage supplied to the input unit and a power supply voltage supplied to the output unit are different.

9. The linear power circuit of claim 3, wherein a power supply voltage supplied to the input unit and a power supply voltage supplied to the output unit are different.

10. The linear power circuit of claim 7, wherein a power supply voltage supplied to the input unit and a power supply voltage supplied to the output unit are different.

11. The linear power circuit of claim 2, wherein a power supply voltage supplied to the input unit and the output unit is common.

12. The linear power circuit of claim 3, wherein a power supply voltage supplied to the input unit and the output unit is common.

13. The linear power circuit of claim 7, wherein a power supply voltage supplied to the input unit and the output unit is common.

14. The linear power circuit of claim 2, wherein a phase compensation is performed by an external output capacitor connected between the output terminal and a ground.

15. The linear power circuit of claim 3, wherein a phase compensation is performed by an external output capacitor connected between the output terminal and a ground.

16. The linear power circuit of claim 7, wherein a phase compensation is performed by an external output capacitor connected between the output terminal and a ground.

* * * * *